(12) United States Patent
Briosi

(10) Patent No.: US 10,668,981 B2
(45) Date of Patent: Jun. 2, 2020

(54) DEVICE FOR MOTION TRANSMISSION ON CYCLES

(71) Applicant: Antonello Briosi, Rovereto (IT)

(72) Inventor: Antonello Briosi, Rovereto (IT)

( * ) Notice: Subject to any disclaimer, the term of this patent is extended or adjusted under 35 U.S.C. 154(b) by 43 days.

(21) Appl. No.: 15/755,409

(22) PCT Filed: Jun. 17, 2016

(86) PCT No.: PCT/IB2016/053625
§ 371 (c)(1),
(2) Date: Feb. 26, 2018

(87) PCT Pub. No.: WO2017/033068
PCT Pub. Date: Mar. 2, 2017

(65) Prior Publication Data
US 2018/0244344 A1    Aug. 30, 2018

(30) Foreign Application Priority Data
Aug. 25, 2015   (IT) .............................. UB2015A3217

(51) Int. Cl.
*B62M 9/10*    (2006.01)
*B62M 9/12*    (2006.01)
(Continued)

(52) U.S. Cl.
CPC .............. *B62M 9/105* (2013.01); *B62M 9/12* (2013.01); *F16H 55/14* (2013.01); *F16H 55/30* (2013.01); *F16D 3/02* (2013.01); *F16D 3/60* (2013.01)

(58) Field of Classification Search
CPC .......... B62M 9/105; B62M 9/12; B62M 9/10; B62M 9/14; F16H 55/30; F16H 55/14; F16D 3/02; F16D 3/60
(Continued)

(56) References Cited

U.S. PATENT DOCUMENTS 4,869,709 A * 9/1989 Nagano ..................... B62M 9/08
474/152
5,205,794 A * 4/1993 Browning ................ B62M 9/14
474/160
(Continued)

FOREIGN PATENT DOCUMENTS

DE    3141296 A1    4/1983
EP    1884460 A2    2/2008
(Continued)

OTHER PUBLICATIONS

FR2590223A1_Translation; Device for Transmitting Irregular Circular Forces to a Chain by Means of a Deformable Plate; Gallee; Published: May 22, 1987; Espacenet (Year: 1987).*
(Continued)

*Primary Examiner* — Michael R Mansen
*Assistant Examiner* — Raveen J Dias
(74) *Attorney, Agent, or Firm* — David B. Tingey; Bryant J. Keller; Kirton McConkie

(57) ABSTRACT

The device for the motion transmission onto cycles comprises:
  a connecting core able to be associated with a frame of a cycle in a rotatable way around an axis of rotation; and
  a ring gear lying on a lying plane surrounding the core and able to be coupled to a flexible transmission element closed on itself in a loop for starting said cycle along a direction of forward movement;
  oscillation means placed between the connecting core and the ring gear and able to tilt the lying plane with respect to the axis of rotation.

9 Claims, 4 Drawing Sheets

(51) Int. Cl.
*F16H 55/30* (2006.01)
*F16H 55/14* (2006.01)
*F16D 3/60* (2006.01)
*F16D 3/02* (2006.01)

(58) Field of Classification Search
USPC ................................ 474/160, 162, 163, 141
See application file for complete search history.

(56) References Cited

U.S. PATENT DOCUMENTS

| | | | | |
|---|---|---|---|---|
| 5,871,221 | A * | 2/1999 | Min | B62M 1/24 280/253 |
| 5,927,149 | A * | 7/1999 | Moody | F16H 55/14 464/89 |
| 6,173,982 | B1 * | 1/2001 | Westergard | B62M 9/085 280/261 |
| 7,462,120 | B1 * | 12/2008 | Thompson | B62M 9/105 474/152 |
| 9,879,752 | B1 * | 1/2018 | Hicken | F16H 55/14 |
| 9,944,347 | B2 * | 4/2018 | Cooke | B62M 1/36 |
| 2008/0202284 | A1 * | 8/2008 | Valle | B62M 3/00 74/594.1 |
| 2013/0008282 | A1 * | 1/2013 | Johnson | B62M 3/00 74/594.2 |
| 2014/0248982 | A1 * | 9/2014 | Schuster | B62M 9/08 474/69 |
| 2015/0274253 | A1 * | 10/2015 | Hara | B62M 1/36 74/594.2 |
| 2017/0167590 | A1 * | 6/2017 | Braedt | B62M 1/36 |
| 2017/0283006 | A1 * | 10/2017 | Schuster | B62M 9/14 |
| 2017/0356312 | A1 * | 12/2017 | Barrera | F01L 1/3442 |
| 2019/0162287 | A1 * | 5/2019 | Hamamoto | B62M 3/003 |

FOREIGN PATENT DOCUMENTS

| | | | | |
|---|---|---|---|---|
| FR | 2590223 | A1 * | 5/1987 | ............ B62M 9/06 |
| GB | 1087559 | A | 10/1967 | |
| GB | 2205918 | A | 12/1988 | |

OTHER PUBLICATIONS

International Search Report and Written Opinion dated Sep. 27, 2016 from International Patent Application No. PCT/IB2016/053625 filed Jun. 17, 2016.

* cited by examiner

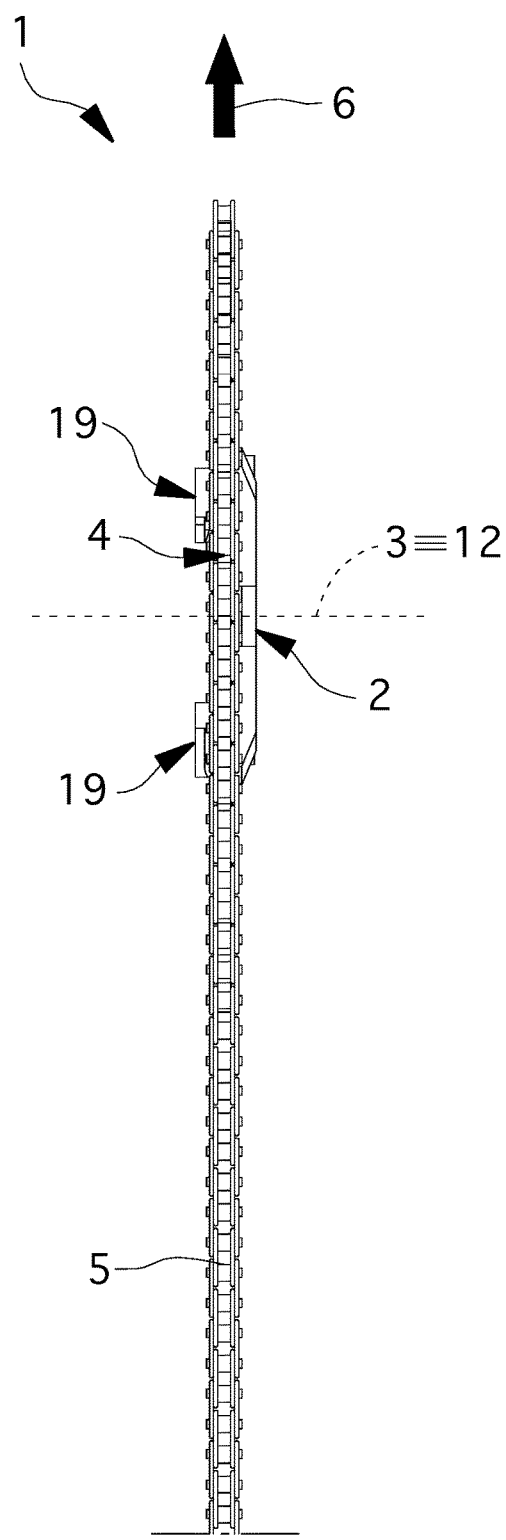
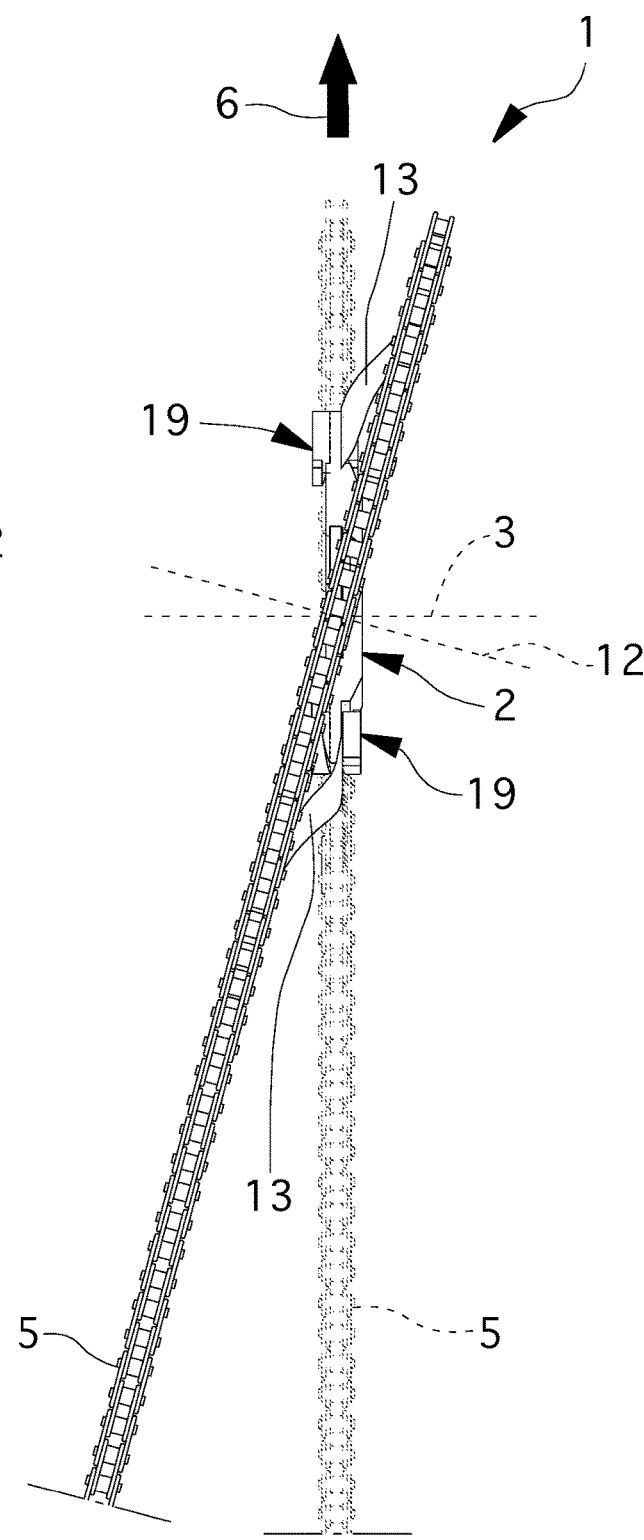
Fig.4
Fig.5

DEVICE FOR MOTION TRANSMISSION ON CYCLES

CROSS REFERENCE TO RELATED APPLICATION(S)

This application is a U.S. National Stage Entry of International Patent Application No. PCT/IB2016/053625, filed Jun. 17, 2016, which claims the benefit of Italian Patent Application No. 102015000046386, filed Aug. 25, 2015, the disclosures of which are hereby incorporated entirely herein by reference.

BACKGROUND

Technical Field

The present invention relates to a device for the motion transmission onto cycles.

Background Art

In the present treatise, the word "cycles" means vehicles with two or more wheels functioning exclusively by muscular propulsion, by means of pedals or similar devices, operated by people on the vehicle.

Also considered as cycles are bicycles with pedal assistance, equipped with an auxiliary electric motor the output of which is progressively reduced and finally cut off when the vehicle reaches a predetermined speed or sooner, if the cyclist stops pedaling The transmission systems commonly used in bicycles and cycles in general envisage the use of a cogwheel mechanism associated with the vehicle wheels The cogwheel mechanism sometimes consists in a first set of gears called "multiplier", mounted rotatably to the vehicle frame, and in a second set of gears called "sprocket", generally associated with the rear wheel Both sets of gears consist of several cogwheels of different dimensions arranged to form a stack of gears having decreasing diameter The multiplier is generally the driving set of gears, i.e., the set of gears which is mobilized by means of cranksets to set the vehicle in motion The multiplier is kinematically connected to the sprocket by means of a chain adapted to drag in motion the sprocket itself, and therefore also the rear wheel of the bicycle. These known transmission systems have two derailleur elements the function of which is to shift the chain from one cogwheel to the other of the same set, so as to achieve different combinations of gear ratios and, therefore, different speeds, the thrust on the crankset being equal The derailleur element is a guide in which the chain can slide and which, through suitable commands, pushes the chain from one wheel to the other by varying, in actual facts, the inclination of the direction of the chain with respect to the anteroposterior direction of the vehicle.

In some cases, the cogwheel mechanism has a set of cogwheels only on the wheel of the bicycle, while the multiplier is limited to a single cogwheel; in these cases the derailleur element is just one and is mounted on the sprocket The transmission systems of known type have various drawbacks related to the fact that the chain undergoes continuous inclination during the travel, both to switch from one gear ratio to another, and to maintain the same gear ratio, while the rotation axes of the cogwheels remain fixed The chain, in fact, by connecting the ring gear to a rear cogwheel aligned to the ring gear itself has a straight direction, but, when it is connected to a cogwheel not aligned to the ring gear, then takes a substantially "s-shaped" pattern, with the stretch of chain not meshed which is inclined with respect to the stretches of chain meshed on the front and rear cogwheels Consequently, the non perfect alignment between chain and cogwheels, dissipates part of the energy generated by the cyclist by producing friction, making his/her pedaling more tiring.

In the long run, also, the frequent inclinations cause a loosening of the adjustments and of the various mechanical components of the system, with consequent problems related to the operation of the system such as, e.g., unwanted shifts of the chain, unwanted shifts from one wheel to another, wear due to incorrect positioning of the chain, etc Furthermore, the chain, following its inclination, produces a friction on the cogwheels and can deform or otherwise wear out the parts of the system (both cogwheels and the chain).

For this reason the traditional systems require frequent, and sometimes expensive, maintenance jobs.

In the particular case of bicycles made with a carbon frame and used in professional races, finally, a cyclist at the maximum of his/her effort can release a power that twists and bends the frame itself.

This leads to an inclination of the axis of rotation of the cranksets with respect to the axis of rotation of the wheel, with consequent malfunction which can cause problems during the normal course of the race.

DESCRIPTION OF THE INVENTION

The main aim of the present invention is to provide a device for the motion transmission onto cycles which allows to facilitate the change of gear ratio and to minimize friction resulting from the inclinations of the chain with respect to the fixed parts, in particular the inner friction of the chain and the contact and sliding ones with the teeth of the ring gear and the seats on which it meshes.

Another object of the present invention is to provide a device for the motion transmission onto cycles which allows to overcome the mentioned drawbacks of the prior art within the scope of a simple, rational, easy and effective to use as well as affordable solution.

The above mentioned objects are achieved by the present device for the motion transmission onto cycles having the characteristics of claim 1.

BRIEF DESCRIPTION OF THE DRAWINGS

Other characteristics and advantages of the present invention will appear better evident from the description of two preferred, but not exclusive, embodiments of a device for the motion transmission onto cycles, illustrated by way of an indicative, but non-limiting, example in the accompanying drawings, wherein:

FIGS. 4 and 5 are a schematic view of the device according to the invention in two different work configurations.

EMBODIMENTS OF THE INVENTION

Figure 1:
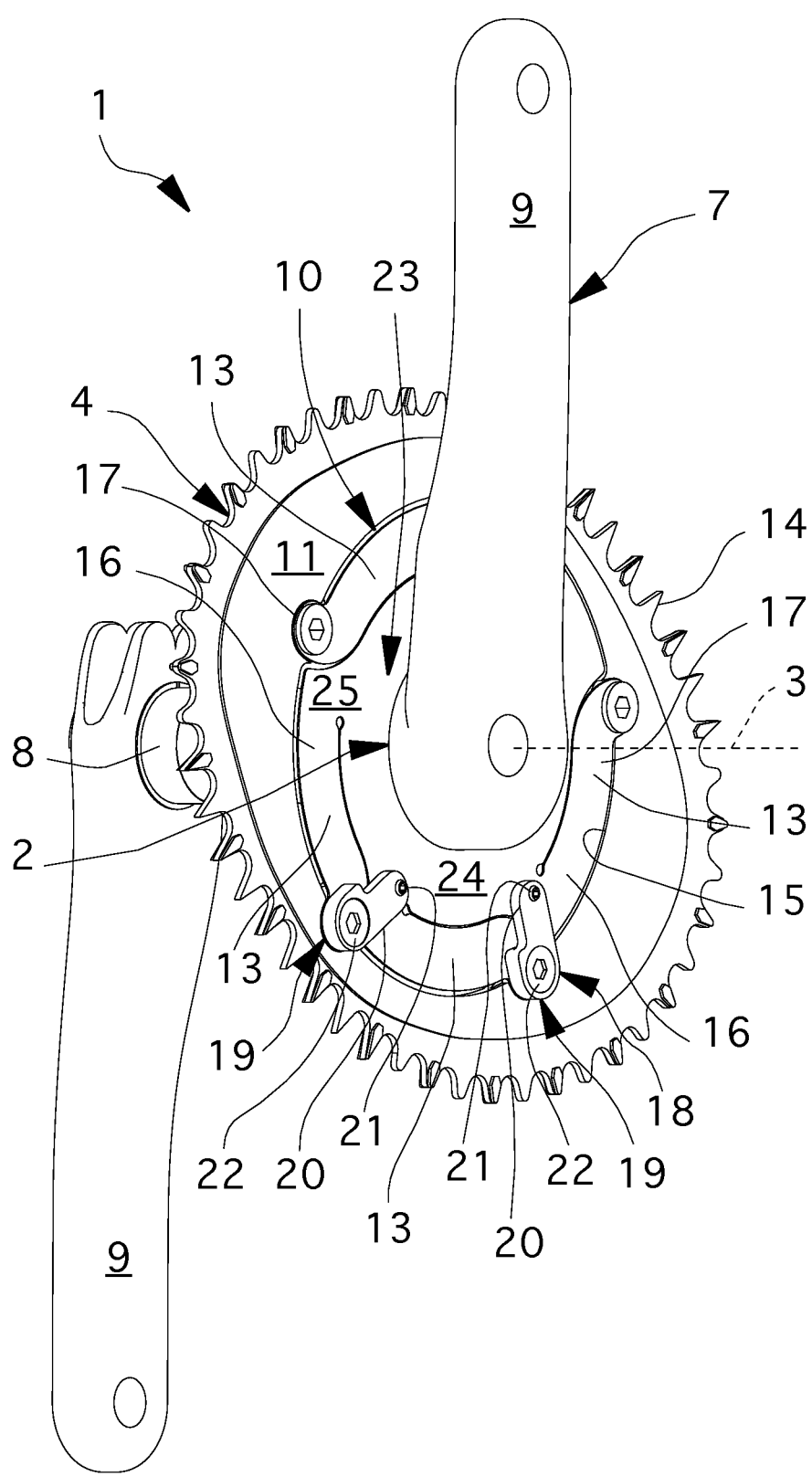
FIGS. 1 and 2 are an axonometric view of a first embodiment of the device according to the invention.

With particular reference to such figures, globally indicated with 1 is a device for the motion transmission onto cycles.

The device 1 comprises a connecting core 2 able to be associated with a frame of a cycle, not illustrated in the figures for the sake of simplicity, in a rotatable way with respect to an axis of rotation 3.

In particular, the core 2 is lying on a plane intended to remain fixed during the motion of the cycle.

Furthermore, the device 1 comprises a ring gear 4 lying on a lying plane 11, surrounding the core 2 and able to be coupled to a flexible transmission element 5 closed on itself in a loop for starting the cycle along a direction of forward movement 6.

In the embodiments illustrated in the figures, the device 1 is a cogwheel having a non-circular profile particularly adapted to maximize the thrust exerted during pedaling.

Different solutions cannot be ruled out wherein the ring gear has different shapes, for example circular.

Still with reference to the present embodiments, the core 2 is the part of the device 1 associated with the crankset system 7 useful to set in motion the cycle itself.

The crankset system 7 is composed of two arms 9 arranged on the opposite side with respect to the core 2, in an angular position offset by 180° and connected in an integral manner by means of a cylindrical element 8, i.e. the "hub".

The axis of the hub 8 coincides with the axis of rotation 3 and is intended to remain constant during pedaling.

By pushing the arms 9 by means of special pedals, for the sake of simplicity not shown in the figures, the torque that is transmitted to the hub 8 and then to the core 2 allows rotating the cogwheel.

This way, the ring gear 4 drags the flexible transmission element 5 in motion, i.e. the "chain".

The links of the chain 5, in fact, couple to the teeth of the ring gear 4 and, as a result of the rotary motion of the latter, the chain itself is pulled.

According to the invention, the device 1 comprises oscillation means 10 placed between the connecting core 2 and the ring gear 4.

The oscillation means 10 are able to tilt the lying plane 11, with respect to the axis of rotation 3.

While maintaining the position fixed of the axis of rotation 3, the device 1 also allows the variation in inclination of the lying plane 11 of the ring gear 4.

This way, when the chain 5 meshes a rear cogwheel misaligned with respect to the ring gear 4, the latter oscillates allowing the chain itself to be arranged in a straight configuration, without undergoing significant deformation and, therefore, minimizing friction.

This feature, furthermore, is particularly useful also when a user of the cycle decides to change the gear ratio by shifting, therefore, the chain from one position to another.

The inclination of the lying plane 11 allows, in fact, to adapt the ring gear 4 to the shift of the chain, minimizing resistance.

In the figures, the inclination is highlighted by the normal direction 12 to the lying plane 11 with respect to the axis of rotation 3.

In the embodiments illustrated in the figures, the oscillation means 10 comprise at least a flexible body 13 able to allow a variation in the position of the ring gear 4 with respect to the core 2.

In particular, the oscillation means 10 comprise a plurality of flexible bodies 13 having an elongated lamellae shape.

More particularly, the ring gear has a toothed outer perimeter 14 and a substantially circular inner perimeter 15 and the flexible bodies extend substantially along the inner perimeter itself.

The flexible bodies 13 comprise a first extremity 16 associated with the core 2 and a second extremity 17 associated with the ring gear 4.

With reference to the sense of rotation of the device 1 when the cycle is in motion, the first extremity 16 precedes, in rotation, the second extremity 17, so as to allow the transfer of motion from the core 2 to the ring gear 4 and avoiding deformation by skidding and instability of the flexible bodies themselves.

This is because, this way, the core 2 during rotation drags the flexible bodies 13 by exerting on them a tensile stress and not a compression one.

The oscillation means 10 also comprise control means 18 able to limit the inclination of the lying plane 11 with respect to the axis of rotation 3 between a first limit position and a second limit position.

The particular configuration cannot be ruled out wherein the first limit position and the second limit position coincide, allowing in this case an inclination of the lying plane 11 equal to zero.

Advantageously, the control means 18 comprise at least one locking element 19 mounted on the ring gear 4 (FIGS. 1 and 2), or on the core 2 (FIG. 3), and adjustable between a first configuration wherein it is in contact with the core 2 (FIGS. 1 and 2), or with the ring gear 4 (FIG. 3), so as to prevent the displacement of the latter, and a second configuration wherein, on the other hand, it is spaced away from the core 2 (FIGS. 1 and 2), or from the ring gear 4 (FIG. 3), so as to permit the displacement of the latter.

The locking element 19 has an adjustment portion 21 able to adjust the deviation of the ring gear 4 with respect to the core 2.

Figure 2:
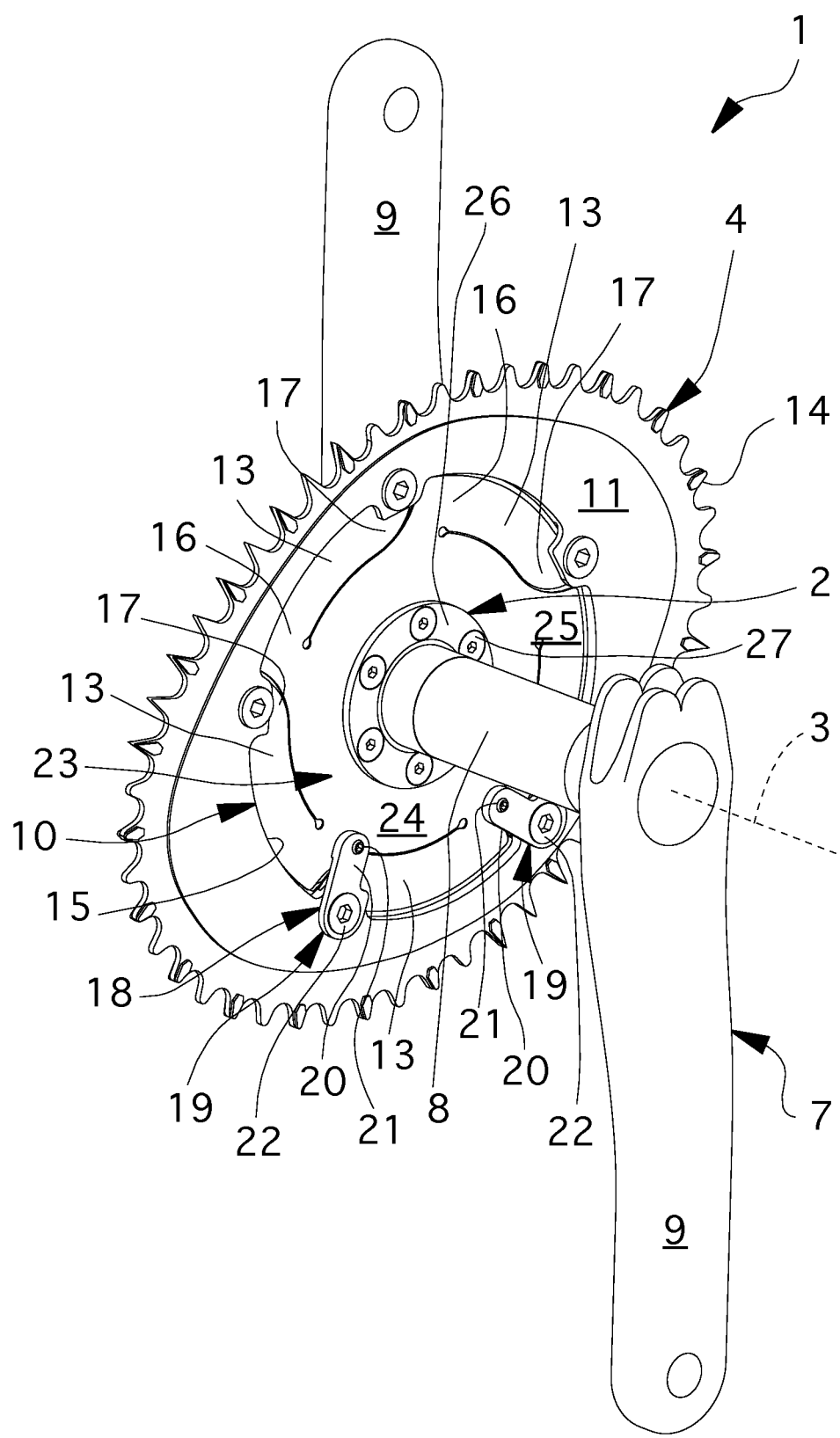

In the solution shown in FIGS. 1 and 2, the locking element 19 comprises a grip portion 20 able to allow the fixing of the locking element itself to the ring gear 4.

In particular, the locking element 19 is fixed by means of the grip portion 20 both to the ring gear 4 and to a flexible body 13 in correspondence of one of the second extremities 17, while the adjustment portion 21 is arranged in correspondence of one of the first extremities 16.

Advantageously, the adjustment portion 21 comprises adjustment screws which, if appropriately adjusted, abut on the less flexible part of the body 13, thus limiting the stroke of its extremities.

The solution cannot be ruled out wherein the adjustment portion 21 is free of adjustment screws, with the maximum oscillation which is predetermined, e.g., in the assembly phase of the various components, or in the realization phase of same.

Figure 3:
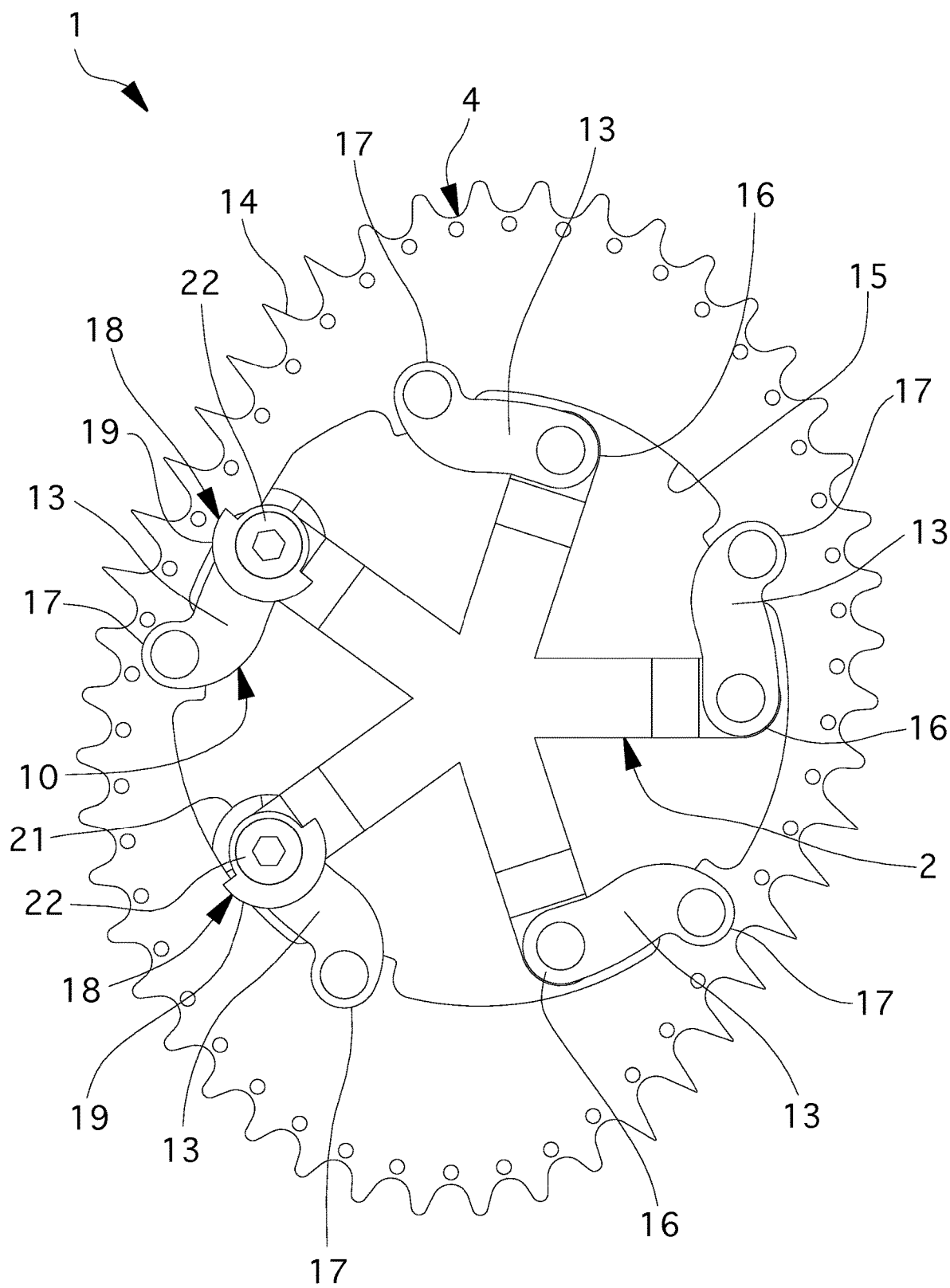
FIG. 3 is a side view of a second embodiment of the device according to the invention.

In the solution shown in FIG. 3, on the other hand, the locking element 19 comprises a semicircular stretch mounted on the core 2 and the adjustment portion 21 is defined by a ramp formed on the semicircular stretch.

By rotating the semicircular stretch on itself, the surface of the ramp 21 moves close to or away from the ring gear 4, and changes the maximum deviation of the ring gear 4 with respect to the core 2.

The control means 18 comprise at least a pair of locking elements 19 arranged on the opposite side with respect to the lying plane 11.

In the illustrated embodiments, the control means comprise two pairs of locking elements 19 arranged on two different angular positions.

With respect to the center of rotation of the core 2, the two locking elements 19 are arranged at two adjacent flexible bodies 13.

This way, three points are fixed, the two extremities of two flexible bodies 13 and the center of rotation, so as to automatically fix the bundle of possible planes upon varying the inclination of the lying plane 11 and so as to prevent any inclination of the lying plane 11 compared to other directions besides that of the axis of rotation 3.

The control means 18 also comprise at least a fixing element 22 of the locking element 19 to the ring gear 4.

In particular, the fixing element 22 is the type of a screw and is able to position and fix, precisely, the locking element 19.

In a first embodiment, shown in FIGS. 1 and 2, the oscillation means 10 comprise a lamina-shaped element 23 divided into a central portion 24 associated with the core 2 and a peripheral portion 25 defining the flexible bodies 13.

In this case, the core 2 comprises the innermost and less flexible part of the lamina-shaped element 23, with the latter clamped by friction by means of a circular flange 26.

The latter is fixed to the lamina-shaped element by means of bolts 27 and is connected to the cylindrical element 8.

The solution cannot be ruled out wherein the connection between the lamina-shaped element 23 and the circular flange 26 simply occurs by means of the connection elements, without having a friction clamping.

The flexible bodies 13 have the first extremity 16 that extends directly from the core 2 and a second extremity 17 associated with the ring gear 4.

In particular, the flexible bodies 13 are not separate bodies, but are directly shaped on the lamina-shaped element 23.

In a second embodiment, illustrated in FIG. 3, the core 2 is composed of rigid elements which extend in a radial pattern starting from the center.

The flexible bodies 13 are separate bodies, with the first extremity associated with a respective extremity of the core 2 by means of the locking elements 19 and the second extremity associated with the ring gear 4.

The operation of the present invention is as follows.

The device 1 is set in rotation by the torque that is obtained from the crankset system 7.

Upon rotation, the ring gear 4 drags in motion the flexible transmission element 5 which, in turn, moves the cycle.

During motion, the chain 5 exerts a force on the ring gear 4 that causes the flexible bodies 13 to bend and, therefore, causes a shift of the ring gear 4 with respect to the core 2, with consequent inclination of the lying plane 11.

The maximum inclination is determined by the locking elements 19 by means of the adjustment of the adjustment portion 21.

In this sense, the locking elements 19 are "end-stops" able to constrain the shift of the ring gear 4 within the limits fixed by the locking element 19.

The solution cannot be ruled out wherein the adjustment portion 21 is already preset, therefore an adjustment is unnecessary.

The device 1 described in the previous embodiments is particularly advantageous in case of single gear systems, i.e. with a single front cogwheel.

Solutions cannot be ruled out that envisage several cogwheels having a ring gear 4 tiltable with respect to a respective core 2.

It has in practice been found that the described invention achieves the intended objects and in particular the fact is underlined that this device for the motion transmission onto cycles permits facilitating the change of gear ratio and minimizing the friction resulting from the inclination of the chain with respect to the fixed parts.

The inclination of the lying plane of the ring gear, in fact, facilitates the shift of the flexible element, or chain, from one position to another during the change of the gear ratio.

This inclination also permits decreasing the resistance of the ring gear itself to the action exerted by the chain, with consequent saving of energy by the user.

The decrease in resistance, besides improving the operation of the transmission system, permits significantly reducing friction and stress at the coupling between the teeth of the ring gear and the chain.

Consequently it is possible to prevent the bending of teeth and/or wear of parts in contact, minimizing the risk of breakage of the elements involved and obtaining advantages linked to the reduction in maintenance jobs.

Thanks to its flexibility, the device also permits preventing the chain from falling off.

Finally, since the frames may be subjected to high torsion and bending values due to the strong thrust of the athletes, the oscillation of the ring gear enables to cope with the inclination of the axis of rotation of the cranksets with respect to the axis of rotation of the wheel.

This way the chain remains aligned, facilitating a smooth pedaling and preventing malfunctions that could compromise the performance of the race.

The invention claimed is:

1. A device for motion transmission onto cycles comprising:
   at least a connecting core able to be associated with a frame of a cycle in a rotatable way around an axis of rotation; and
   a ring gear lying on a lying plane surrounding said connecting core and able to be coupled to a flexible transmission element closed on itself in a loop for starting said cycle along a direction of forward movement;
   wherein said device comprises oscillation means placed between said connecting core and said ring gear and able to tilt said lying plane with respect to said axis of rotation,
   wherein said oscillation means comprise control means able to limit inclination of said lying plane with respect to said axis of rotation between a first limit position and a second limit position, and
   wherein said control means comprise at least one locking element mounted on said ring gear or on said connecting core, and adjustable between a first configuration wherein it is in contact with said connecting core, or with said ring gear, to prevent displacement of said ring gear, and a second configuration wherein it is spaced from said ring gear or from said connecting core, to permit displacement of said ring gear.

2. The device according to claim 1, wherein said oscillation means comprise at least a flexible body to allow a variation in position of said ring gear with respect to said connecting core.

3. The device according to claim 2, wherein said oscillation means comprise a plurality of said flexible bodies having an elongated shape.

4. The device according to claim 3, wherein said ring gear has a toothed outer perimeter and a substantially circular inner perimeter, with said plurality of flexible bodies extending substantially along said inner perimeter.

5. The device according to claim 3, wherein said plurality of flexible bodies comprise a first extremity associated with said connecting core and a second extremity associated with said ring gear.

6. The device according to claim 3, wherein said oscillation means comprise a lamina-shaped element divided into a central portion associated with said connecting core and a peripheral portion defining said plurality of flexible bodies, said plurality of flexible bodies comprising a first extremity associated with said connecting core and a second extremity associated with said ring gear.

7. The device according to claim 1, wherein:

said oscillation means comprise a plurality of flexible bodies to allow a variation in position of said ring gear with respect to said connecting core, said plurality of flexible bodies having an elongated plate-like shape;

said oscillation means comprise a lamina-shaped element divided into a central portion associated with said connecting core and a peripheral portion defining said flexible bodies, said plurality of flexible bodies comprising a first extremity associated with said connecting core and a second extremity associated with said ring gear;

said locking element has at least an adjustment portion arranged in correspondence of at least one of said plurality of first extremities and able to adjust a deviation of said ring gear with respect to said connecting core.

8. The device according to claim 1, wherein said control means comprise at least a pair of said locking elements arranged on an opposite side of said lying plane.

9. The device according to claim 1, wherein said control means comprise two pairs of said locking elements arranged on two different angular positions.

* * * * *